W. R. Thomas and T. Evans,
Steam Engine Valve.

Nº 76,002

Patented Mar. 24. 1868.

Witnesses.
Thos Lusche
Wm Trewin

Inventor
W R Thomas
Thos Evans
Per Munn &c
Attorneys

United States Patent Office.

W. R. THOMAS AND THOMAS EVANS, OF CATASAUQUA, PENNSYLVANIA.

Letters Patent No. 76,002, dated March 24, 1868.

IMPROVEMENT IN STEAM-ENGINE PISTON-VALVES.

*The Schedule referred to in these Letters Patent and making part of the same.*

TO ALL WHOM IT MAY CONCERN:

Be it known that we, W. R. THOMAS and THOMAS EVANS, of Catasauqua, in the county of Lehigh, and State of Pennsylvania, have invented a new and useful Improvement in Steam-Engine Valves; and we do hereby declare that the following is a full, clear, and exact description thereof, which will enable those skilled in the art to make and use the same, reference being had to the accompanying drawings forming part of this specification.

This invention relates to a new construction of steam-engine valves; and the invention consists in two piston-valves on one rod in a cylindrical steam-chest, and in the arrangement of the ingress and egress-steam passages, and arms on the piston-rod of the engine, as will be hereinafter described.

Similar letters of reference indicate corresponding parts.

Figure 1:
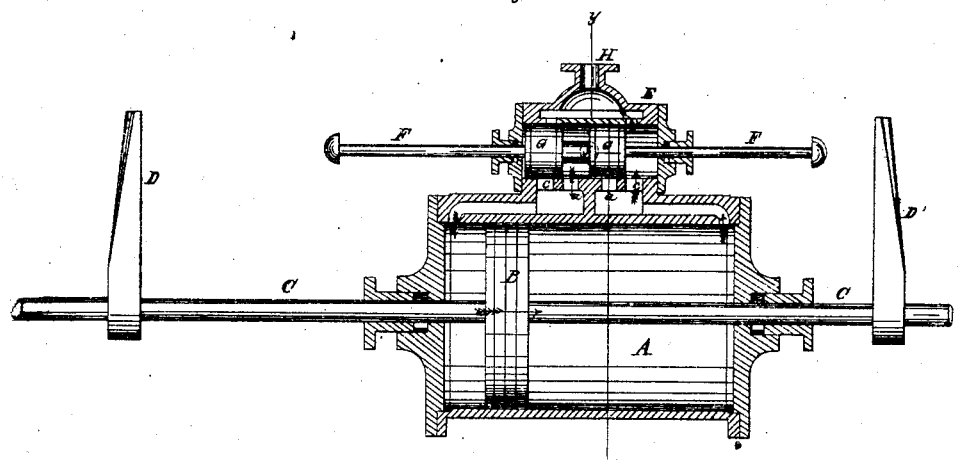
Figure 1 represents a vertical longitudinal section of the engine and valve-chest through the line $x\ x$ of fig. 2.
Figure 2:
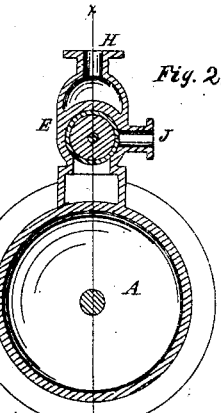
Figure 2 is a cross-section of fig. 1 through the line $y\ y$.

A represents the steam-engine cylinder; B is the piston, and C is the piston-rod. D D' are arms on the piston-rod. E represents the valve-chest. F is the valve-rod, which passes through both ends of the chest, as seen in the drawing. G G' represent the valves or pistons on the rod F. When the piston of the engine has arrived nearly to the end of its stroke, one of the arms on its rod will come in contact with the end of the valve-rod F, and move the valves sufficiently to close one of the steam-ports and open one of the exhaust-ports a very little, (say about one-eighth of an inch,) and at the same time open the steam-port which communicates with the opposite end of the cylinder. This position is seen in fig. 3, and in this position the exhaust steam has no outlet, but the pressure of the exhaust steam will force the piston back, so that it can escape, and at the same time open the opposite steam-port, as stated, when the operation is repeated.

Figure 3:
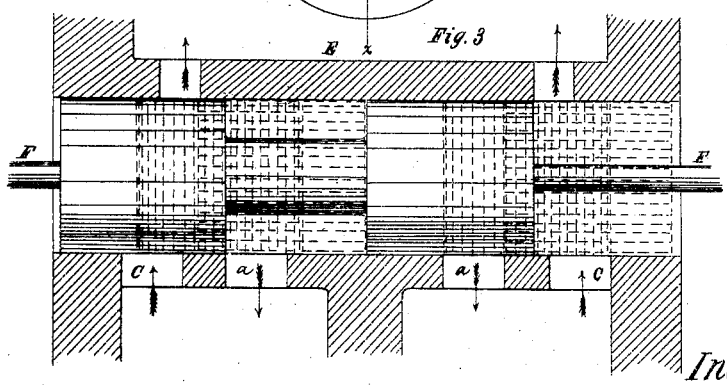
Figure 3 is a longitudinal section of the valve-chest through the line $x\ x$ of fig. 2, on an enlarged scale.

In fig. 3, the valves are shown in the different positions named, and the steam flows as indicated by the arrows. It will be seen that only the initial impulse is given to the valves by the arms on the piston-rod, the movement of the valve being completed by the pressure of the exhaust steam. H indicates the exhaust-pipe, and J the steam-pipe. $a\ a$ are the ingress-ports, and $c\ c$ the exhaust-ports.

Having thus described our invention, what we claim as new, and desire to secure by Letters Patent, is—

The valves G G', operated by the arms D D', and by the exhaust steam, in combination with a steam-engine with steam and exhaust-ports $a\ a$ and $c\ c$, arranged as described, the whole combined and operating substantially as shown and described.

The above specification of our invention signed by us, this 24th day of July, 1867.

W. R. THOMAS,
THOMAS EVANS.

Witnesses:
DANIEL MILSON,
JOSEPH HUNTER.